US007051926B2

(12) United States Patent
Saltsov et al.

(10) Patent No.: US 7,051,926 B2
(45) Date of Patent: May 30, 2006

(54) INTEGRATED BANKNOTE VALIDATOR AND DISPENSER

(75) Inventors: Leon Saltsov, Thornhill (CA); Sergiy Bukhman, Toronto (CA); Dmytro Baydin, North York (CA); Bogdan Mishunin, Thornhill (CA); Oleksandr Onipchenko, Thornhill (CA); Boris Gisar, Kyiy (UA); Sergiy Androsyuk, Thornhill (CA)

(73) Assignee: CashCode Company Inc., Concorde Ont. (CA)

( * ) Notice: Subject to any disclaimer, the term of this patent is extended or adjusted under 35 U.S.C. 154(b) by 443 days.

(21) Appl. No.: 10/129,652

(22) PCT Filed: Mar. 2, 2001

(86) PCT No.: PCT/CA01/00268

§ 371 (c)(1),
(2), (4) Date: May 9, 2002

(87) PCT Pub. No.: WO01/65493

PCT Pub. Date: Sep. 7, 2001

(65) Prior Publication Data

US 2002/0162775 A1 Nov. 7, 2002

(30) Foreign Application Priority Data

Mar. 2, 2000 (CA) .................................... 2299827

(51) Int. Cl.
*G06F 17/60* (2006.01)

(52) U.S. Cl. .......................................... 235/379; 902/8

(58) Field of Classification Search ................ 235/379, 235/381; 902/8–15, 17; 271/3.01, 3.14, 271/109, 110; 194/206, 225, 302, 342, 346, 194/295

See application file for complete search history.

(56) References Cited

U.S. PATENT DOCUMENTS

| | | | | | |
|---|---|---|---|---|---|
| 4,517,451 | A * | 5/1985 | Kokubo et al. | ............. | 235/379 |
| 4,549,661 | A * | 10/1985 | Morishita et al. | ........... | 271/186 |
| 4,739,156 | A * | 4/1988 | Watanabe | ................... | 235/379 |
| 4,746,110 | A * | 5/1988 | Chiba | ........................ | 271/3.14 |
| 4,775,783 | A * | 10/1988 | Sasaki et al. | ............... | 235/379 |
| 4,854,452 | A * | 8/1989 | Uchida et al. | .............. | 235/379 |
| 4,889,240 | A * | 12/1989 | Sato et al. | .................. | 235/475 |
| 4,905,841 | A * | 3/1990 | Hirata et al. | ................ | 235/379 |
| 4,992,648 | A * | 2/1991 | Hutchison | ................... | 235/379 |
| 5,113,990 | A * | 5/1992 | Gabrius et al. | ............. | 194/206 |
| 5,135,212 | A * | 8/1992 | Utsumi et al. | .............. | 235/379 |
| 5,163,671 | A * | 11/1992 | Walters | ...................... | 271/186 |
| 6,098,837 | A * | 8/2000 | Izawa et al. | .................. | 902/13 |
| 6,170,822 | B1 * | 1/2001 | Kato et al. | .................. | 271/298 |
| 6,213,310 | B1 * | 4/2001 | Wennersten et al. | ........ | 209/534 |
| 6,296,242 | B1 * | 10/2001 | Saltsov et al. | ............. | 271/3.21 |

(Continued)

FOREIGN PATENT DOCUMENTS

EP 0 645 741 A 3/1995

(Continued)

*Primary Examiner*—Thien M. Le
*Assistant Examiner*—Uyen-Chau N. Le

(57) ABSTRACT

A combination banknote validator, banknote accumulator, banknote storage cassette and banknote dispenser is designed in a modular manner and the accumulator and banknote dispenser cooperate to additionally define part of a processing pathway therebetween. The banknotes can move in either direction along the processing pathway and preferably several accumulators are located along the pathway. The banknote dispenser is of a rotary design and stacks banknotes on the surface thereof and dispenses a stack of banknotes through a discharge opening.

29 Claims, 17 Drawing Sheets

U.S. PATENT DOCUMENTS

| | | | | |
|---|---|---|---|---|
| 6,371,473 | B1 * | 4/2002 | Saltsov et al. | 271/3.01 |
| 6,474,549 | B1 * | 11/2002 | Katou et al. | 235/379 |
| 6,481,620 | B1 * | 11/2002 | Katou et al. | 235/379 |
| 6,585,098 | B1 * | 7/2003 | Satou et al. | 194/206 |
| 6,637,647 | B1 * | 10/2003 | Katou et al. | 235/379 |

FOREIGN PATENT DOCUMENTS

| | | | |
|---|---|---|---|
| EP | 0 907 152 | A | 4/1999 |
| WO | WO 9835324 | A1 * | 8/1998 |
| WO | WO 99 67750 | A | 12/1999 |

* cited by examiner

INTEGRATED BANKNOTE VALIDATOR AND DISPENSER

BACKGROUND OF THE INVENTION

The present invention relates to banknote validators which are additionally designed to selectively store received banknotes in a manner to allow later dispensing thereof.

Banknote validators are widely used in vending machine applications as well as other machines designed for financial transactions. These validators receive a banknote and conduct an evaluation to determine the denomination and authenticity of the banknote. If the banknote is accepted, it is normally stored in a removable cassette and the user is provided with an appropriate credit with respect to the vending machine.

It has also been known to combine a banknote validator with a banknote dispensing unit. The banknote dispensing unit allows dispensing of banknotes which have been previously stored in the device. Banknotes received by the validator are separately stored in the removable banknote cassette and are not fed to the banknote dispensing unit. Basically, these type of machines are serviced on a frequent basis and the banknote dispensing units are charged with a new supply of banknotes.

An automatic teller machine is disclosed in U.S. Pat. No. 5,135,212 where received banknotes are temporarily stored for later dispensing. Banknotes of a predetermined denomination are temporarily stored in an accumulator and subsequently dispensed as required.

One of the problems associated with combination banknote validators and dispensers is the small amount of space available in vending or gaming machines for receiving the unit. In addition, banknote validators with an accumulator have not been reliable and are subject to higher maintenance. Stand alone combined banknote acceptors and dispensers have not been cost-effective to businesses requiring a high dollar revenue per square foot of retail space.

The present invention overcomes a number of these problems with respect to the prior art structures.

SUMMARY OF THE INVENTION

An integrated banknote acceptor and dispenser according to the present invention comprises a validator, a banknote dispenser, at least one banknote accumulator, and a banknote cassette. The validator receives a banknote through a banknote inlet and evaluates the banknote as it is processed through the validator to a discharges path and discharges accepted banknotes to the discharge path. The discharge path includes drive means for moving accepted banknotes from the validator through a directing switch to one of the banknote cassette, the at least one accumulator, and the banknote dispenser. The directing switch is a rotary switch connectable with a stationary inlet associated with each of the said at least one banknote dispenser, and a stationary inlet of the banknote cassette. The directing switch has at least three routing paths through the directing switch which allow connection of the discharge path with any of the inlets of the at least one banknote dispenser and the banknote cassette and allow connection of the inlet of each banknote accumulator with an inlet of the banknote dispenser. The banknote dispenser and each banknote accumulator include a separate drive means for receiving and discharging a banknote therefrom.

According to an aspect of the invention, the at least one banknote accumulator is at least two banknote accumulators.

In a further aspect of the invention, the at least one banknote accumulator is three banknote accumulators and each banknote accumulator receives and accumulates banknotes of a particular denomination.

In a further aspect of the invention, the directing switch selectively connects said discharge path with any of said inlets.

A combination bill validator, bill accumulator and bill dispensing unit according to the present invention comprises in combination a validator for receiving banknotes and evaluating banknotes and forwarding accepted banknotes to a processing pathway, and a series of modular components spaced either side of said processing pathway. The series of modular components include at least one banknote accumulator for receiving and temporarily storing received banknotes and outputting received banknotes to the processing pathway and a banknote dispenser which receives banknotes from the pathway and discharges received banknotes through a discharge port. The combination unit further includes a removable banknote cassette connecting with said pathway for receiving and storing banknotes in a stacked manner. The processing pathway includes a drive arrangement located in the pathway for engaging and driving a banknote along the pathway to any of said modules or banknote cassette and a central switch for selectively connecting any of said modules and said banknote cassette.

The combination unit according to an aspect of the invention locates the modular components in opposed pairs of modular components with the pathway therebetween.

According to a further aspect of the invention each modular component each includes an additional banknote drive for driving a banknote within said modular component and from each modular component.

The combination unit according to yet a further aspect of the invention locates the banknote dispenser opposite one of said at least one banknote accumulator and the series of modular components include two additional banknote accumulators in opposed relationship with said pathway therebetween.

The combination unit according to a different aspect of the invention includes a separate controller and processing arrangement and wherein said modular components are all controlled by said separate controller and processing arrangement.

A modular component according to the present invention is used in combination with a banknote validator. The modular component includes a generally straight wall section having a first banknote drive arrangement projecting outwardly therefrom for engaging a banknote and driving said banknote along a path generally parallel to said straight wall section, said modular component including a banknote opening through which banknotes are received into said component and an arrangement for discharging banknotes from the component. The modular component includes a second banknote drive arrangement interior to said component which drives received banknotes within said modular component during receipt and discharge of a banknote from the component.

The modular component according to an aspect of the invention is a banknote accumulator for receiving banknotes for temporary storage and dispensing of received banknotes through a banknote opening and wherein said banknote opening forms part of said arrangement for discharging banknotes and banknotes are discharged through said opening.

The modular component according to an aspect of the invention includes a projecting drive member at one edge of said straight wall section and an idler member at an opposite edge of said straight wall section and wherein the projecting drive member and said idler member form part of said drive arrangement.

The modular component according to a further aspect of the invention is operable in one two orientations on opposite sides a banknote processing pathway.

The banknote dispenser according to an aspect of the invention receives and stacks banknotes received from said pathway and the discharge arrangement dispenses a stack of banknotes through a discharge port.

The banknote dispenser according to a further aspect of the invention includes a rotary accumulator upon which banknotes are stacked one above the other and from which stacked banknotes are dispensed.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
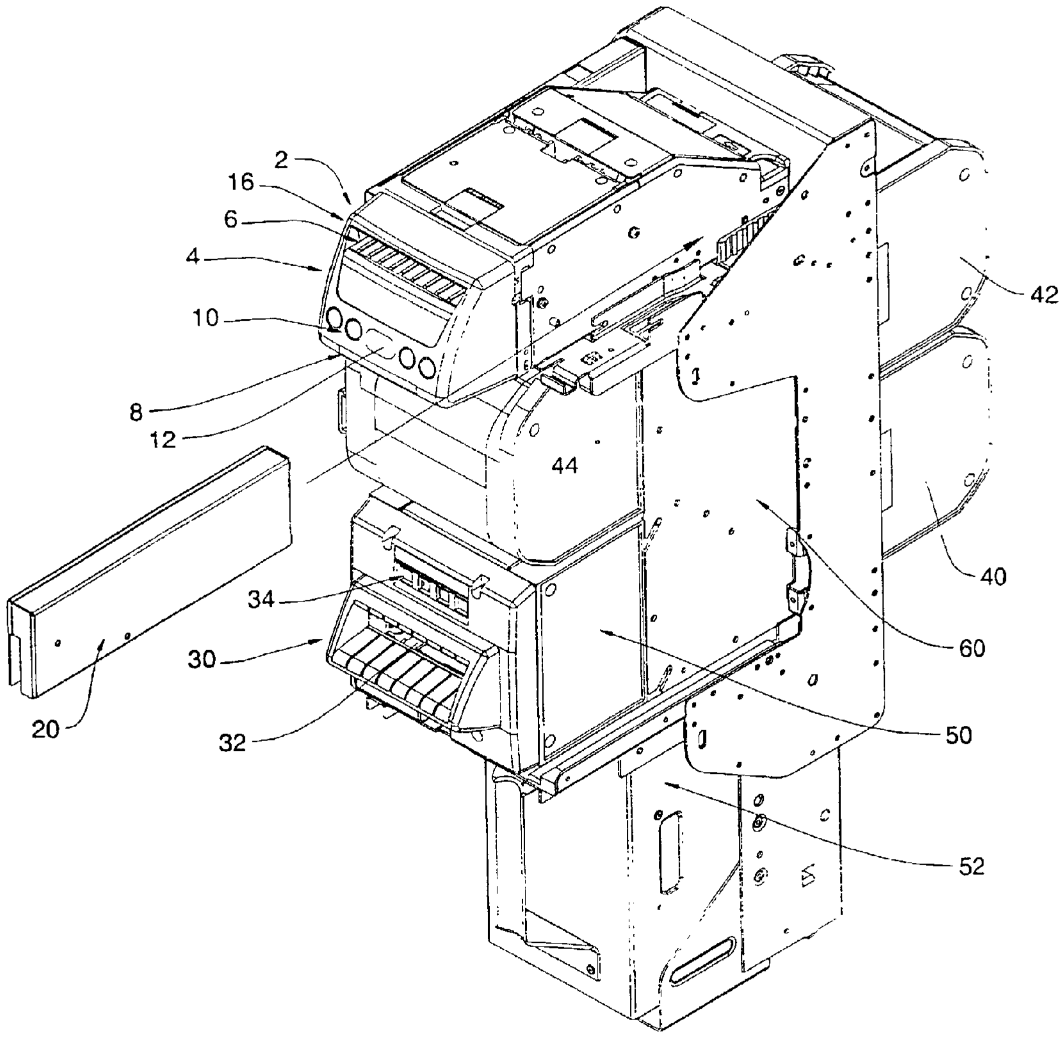
FIG. 1 is a perspective view of an integrated validator dispenser with a back up power supply removed.

The integrated validator and dispenser 2 is typically mounted in a cabinet 3 (FIG. 3) or other structure where the user has access to the bezel 16 of the validator 2 and the bezel 30 of the banknote stacker and dispenser 50. A user inserts banknotes to the validator 4 through the banknote slot 6 and the validator 4 conducts an evaluation of the banknote as it is moved through the validator. This evaluation determines whether the banknote is accepted or rejected. If the banknote is rejected, it is preferrably returned to the user through the same banknote slot 6. If the banknote is accepted, the validator discharges the banknote at 15 to the central processing path 17 for eventual processing of the banknote by the combination unit.

Figure 2:
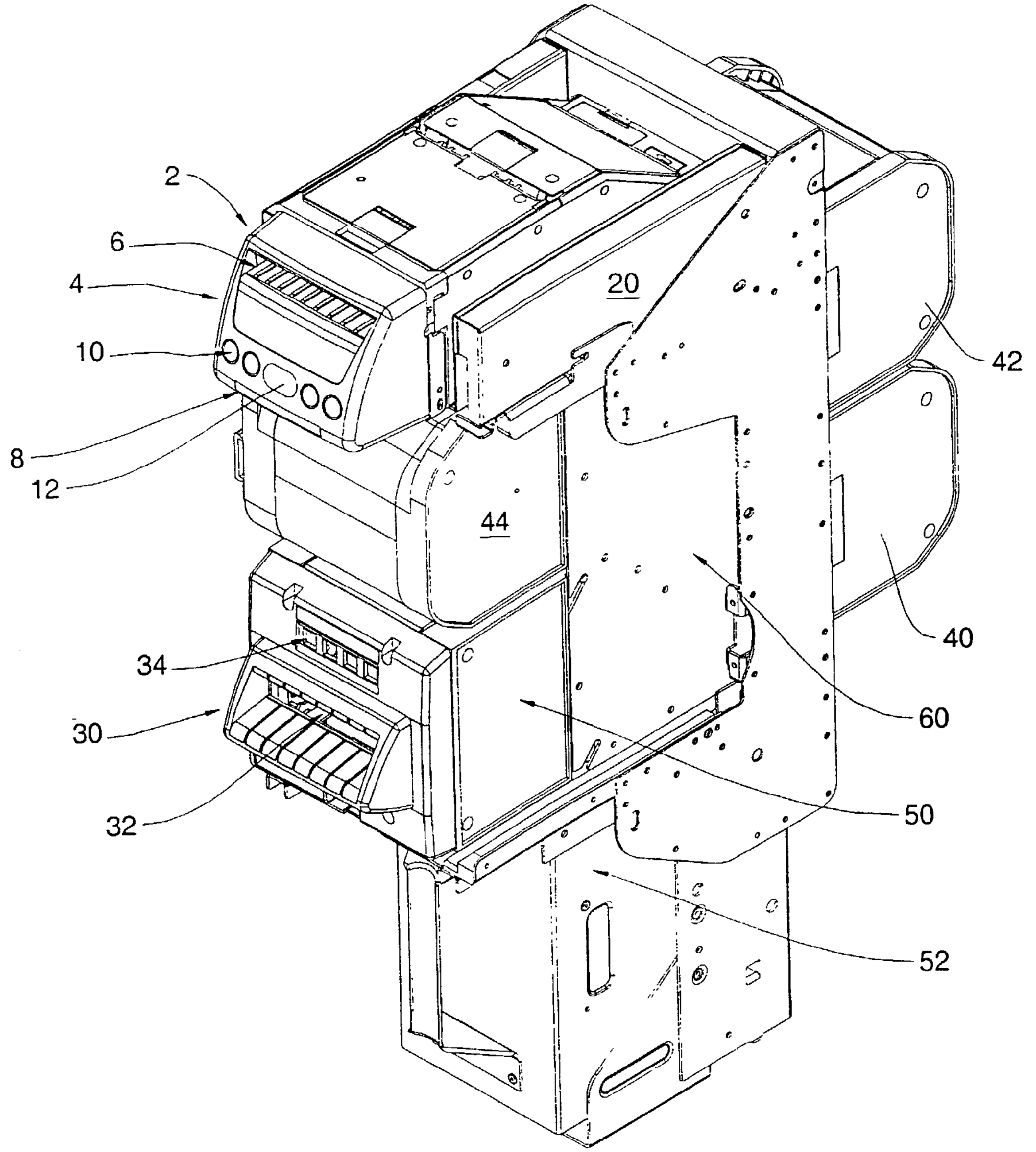
FIG. 2 is a perspective view of the device with the back up power supply received in the device.

The integrated validator and dispenser has a backup chargeable power supply 20 to allow the integrated unit to complete any transactions in the event of a power disruption. This integrated unit is capable of receiving a series of banknotes using the banknote validator and allowing the user to achieve a desired credit value. The credit value can be displayed by the validator, such as on the display screen 12. The integrated unit is also capable of returning the precise banknotes or other banknotes to the user in the event that the user cancels the transaction. A disruption of power can cause problems if it occurs during a transaction and the backup power supply 30 overcomes this problem. This power supply is removable as shown in FIG. 1 and is inserted into the device to provide the necessary power when located in the position shown in FIG. 2.

The integrated device also allows the user to insert a smart card through the smart card slot 8 for electronic payment of a transaction. Typically, the integrated validator and dispenser is associated with a further device such as a vending machine, gaming machine or financial transaction terminal in a retail location and as such, receives signals regarding the value of a desired transaction. The integrated unit allows the user to effect payment. The validator can include certain control buttons indicated as 10 and the dispenser can also include a series of buttons 34.

Figure 3:
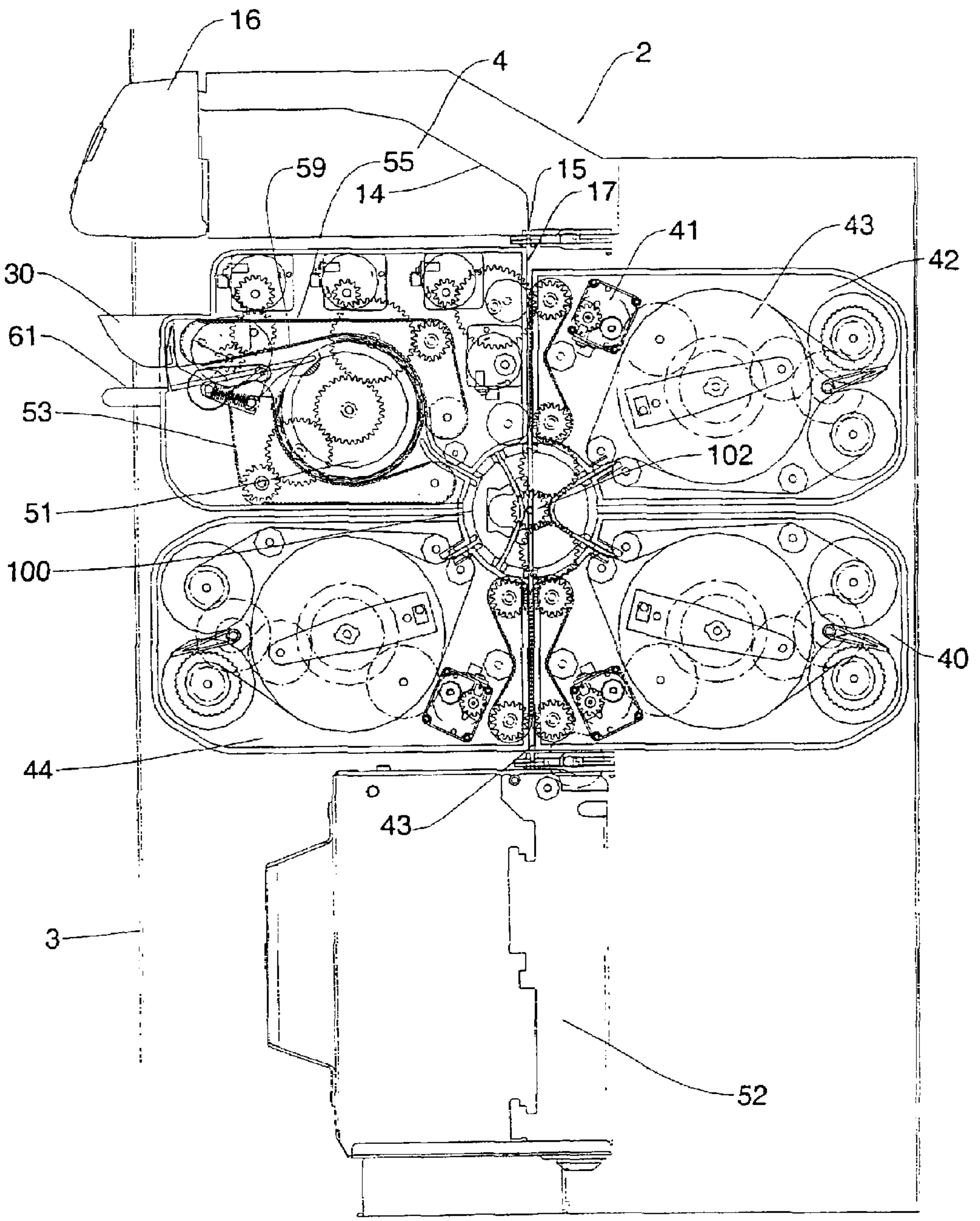
FIG. 3 is a partial sectional view of the device located in a vending machine.

The processing of the banknote after it has been accepted by the validator can be appreciated from the sectional view of FIG. 3. An accepted banknote is passed through the validator and moved along path 14 and is discharged from the validator at position 15. A banknote moves from the discharge location 15 to the central processing path 17 and transported towards the directing rotary switch 100. The rotary switch 100 is rotatable about the central axis 102 and can assume various positions for connecting any of the accumulators 40, 42 and 44 with the banknote stacker and dispenser 50, or with each other, or can allow the accepted banknote to move through the switch to be received in the removable banknote cassette 52. The rotary switch shown has basically three paths; one path being a 60 degree connection which in this case, shows accumulator 42 connected with the accumulator 40. It also has a straight through path which is connected to allow a banknote to pass through the center of the switch and a further path 120 which in this case, is not connecting any of the units. Depending upon the decision by the validator with respect to how the received banknote is to be treated, the rotary switch is adjusted to complete the necessary path.

The accumulators 40, 42 and 44 are all of the same design and are replaceable, one with the other. They each include an entryway 30 degrees from the horizontal for cooperating with the rotary switch 100. Similarly, the banknote stacker and dispenser 50 has an entryway 30 degrees from the horizontal.

A received banknote can be stored in any of the accumulators 40, 42 and 44 or can be stored in the banknote cassette 52. Each of the accumulators stores a banknote in series and winds the banknote about a drum. Belts are provided which are wound onto the drum with the banknote and serve to separate received banknotes one from the other. Thus the banknotes are stored in the accumulators in a serial manner and are dispensed from the unit one by one. Each accumulator includes its own reversible motor 41 for rotating the drum 43 through a drive train arrangement as shown. As the belt is fed onto the drum 43, an underlying belt or tape is also wound on as well as an overlying tape. In this way, a newly received banknote separated from banknotes earlier wound on the accumulator.

In some cases, it is necessary for the integrated unit to return to the customer a certain value which can include returning a number of banknotes to the user. This can occur to provide change to the user or perhaps the transaction has been cancelled. Preferrably, each of the accumulators 40, 42 and 44 store banknotes of a specified denomination. For example, accumulator 42 could store $5 banknotes, accumulator 40 could store $10 banknotes, and accumulator 44 could store $20 banknotes. In this case, if a user inserts a $5 banknote and it is accepted by the validator, the banknote can be accumulated in accumulator 42 for later dispensing if necessary. Thus, each of the accumulators can store accepted banknotes for later dispensing.

As will be more fully explained, each of these accumulators can also temporarily serve as an escrow unit, or collectively serve as an escrow unit. For example, the validator can keep track of a series of banknotes which are inserted and accepted by the validator. In this case, perhaps accumulator 42 has been temporarily assigned to the an escrow accumulator. A series of banknotes are accepted by the validator, and stored in series in accumulator 42. If the transaction is accepted, the accumulator 42 and the integrated unit can then remove the banknotes from the accumulator for appropriate storage in one of the other accumulators or perhaps storage in the banknote cassette 52. It can also be appreciated that the accumulators can act collectively as an escrow accumulator with each of these devices temporarily storing certain banknotes with the validators maintaining track of which banknotes have been inserted and approved.

In this escrow function, the fact that the banknote accumulator stores a certain denomination can be overlooked, as it is functioning as a temporary escrow unit. Once the transaction has been accepted, decisions can be made with respect to whether these accepted banknotes should be stored on an accumulator for later use or perhaps they will be discharged to the banknote cassette.

The integrated unit can also provide a return of the credit amount by merely maintaining an account of the amount of funds stored on the accumulators and confirming that the collected received banknote value can be returned. For example, a user could insert a $50 bill and this banknote could be accepted and placed in the banknote cassette 52. This would be the case if the accumulator storing $10 banknotes has at least five of these banknotes returned to the user in the event of cancellation. This determination can also be based on the effective amounts collectively stored on the accumulators and the ability to return this amount to the user.

Under this operating system, it is not necessary to return the identical banknotes to the user. It can also be appreciated that this device can operate using either of these operating systems and can initially function to accumulate the received banknotes for return of the identical banknotes to a user but default to the second criteria if it is more desirable as determined by the combination device.

FIG. 3 shows additional details of the banknote stacker and dispenser 50. This unit receives banknotes from any of the accumulators and allows received banknotes to be stacked one on top of the other on the rotating drum 51. This rotating drum cooperates with the endless belts 53 and 55 to maintain the banknotes in a stack on the drum. A banknote is fed through the inlet 57 in timed relationship with any banknotes stacked on the drum 51, and thus, a stack of banknotes is accumulated on the drum. When the desired stack of banknotes to be dispensed has been accumulated on the drum 51, a lever actuator 59 is brought into engagement slots in the drum and rotation of the drum in the same direction will cause the stack of banknotes to be stripped from the drum and discharged through the outlet 61 as a stack of banknotes. The actuator 59 is normally out of contact with the drum and is only brought into contact with the drum beneath the surface that the banknotes are stacked in the drum, to effect stripping of the stacked banknotes from the drum and dispensing of the banknotes through the slot 61.

Figure 4:
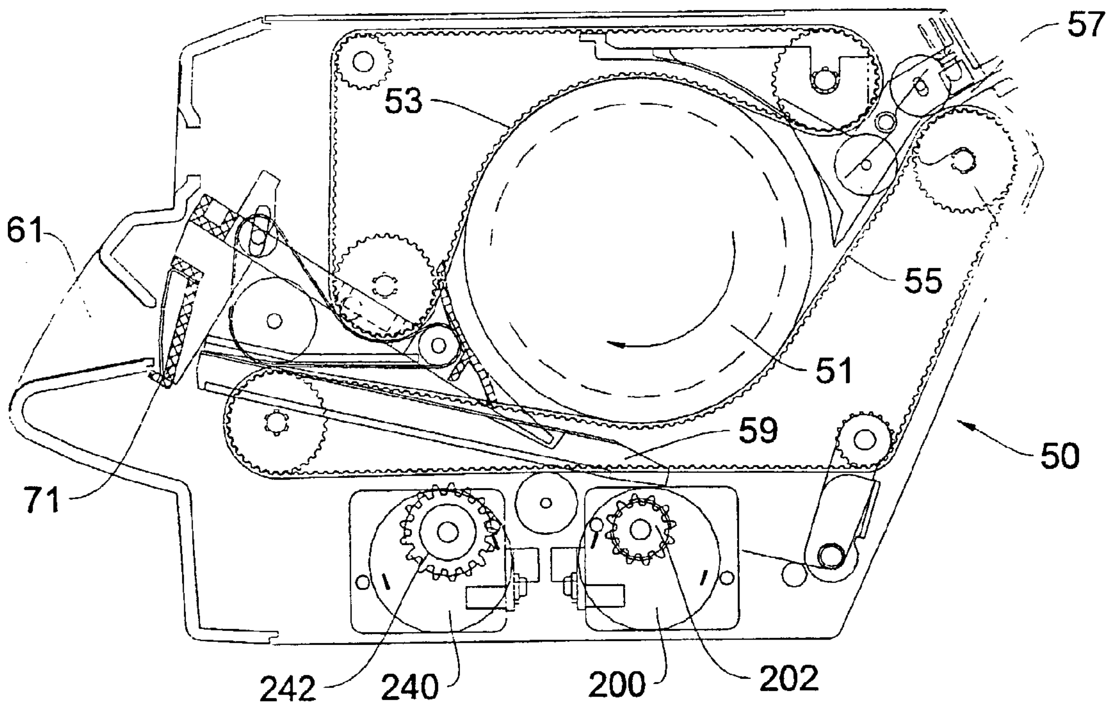
FIG. 4 is a sectional view of the stacking and dispensing module.

FIG. 4 shows the stacker dispenser, but in this case, the stacker dispenser 50 would be positioned within the device where the accumulator 44 is located. A banknote is received through the inlet 57 and is stacked on the drum 51. As can be seen the drum 51 is slotted and this allows the actuator 59 to contact the drum below the level that the banknotes are stacked thereon. The drum 51 of FIG. 4 is always rotated in the direction shown. A received banknote is moved by belt 55 and brought into contact with drum 51. This is a timed relationship such that the banknote will be stacked on top of any other banknotes which have been stacked on the drum 51. The actuator 59 is located between the belts, and as such, does not interfere with belt 55. The actuator 59 in FIG. 4 is shown in a clear position and it can also be seen that the actuator 59 in this position has provided a block 71 to the dispensing slot 61.

Banknotes will continue to be accumulated on the drum 51 until such time the actuator is appropriately moved into contact with the drum and the drum is continued to be rotated. Thus with the actuator position as shown in FIG. 4, banknotes will be stacked on the drum 51, one above the other. Belts 55 and 53 maintain the stack of banknotes on the drum.

Figure 5:
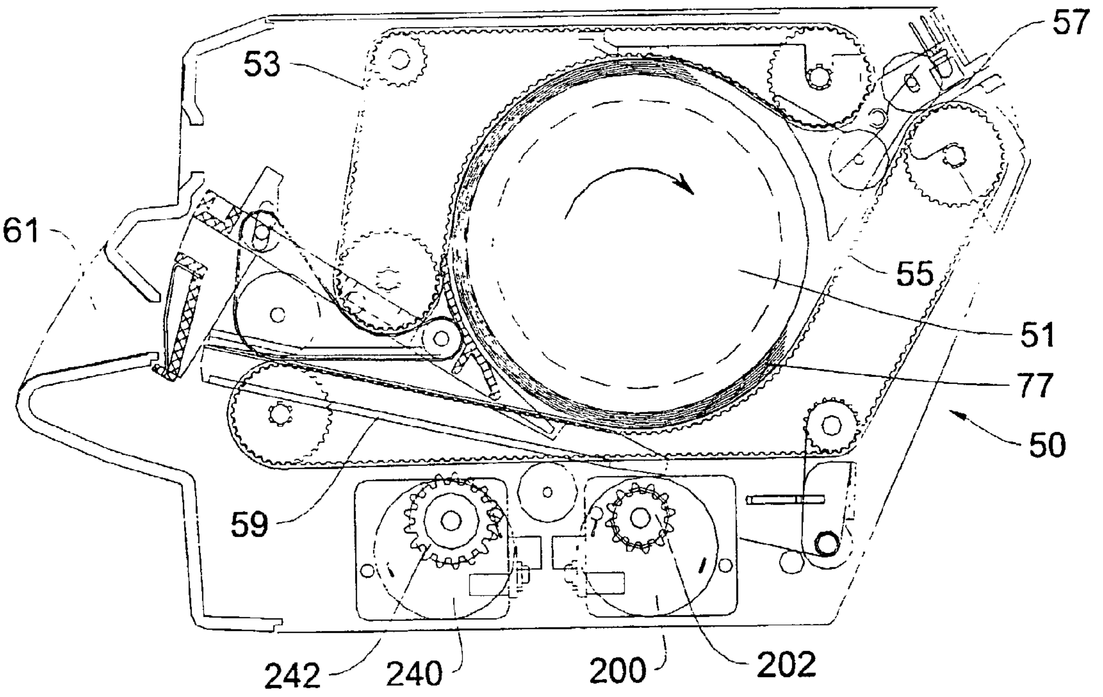
FIG. 5 is a sectional view of the stacking and dispensing module with a stack of banknotes therein.

FIG. 5 shows a stack 77 of banknotes accumulated on the drum 51.

Figure 6:
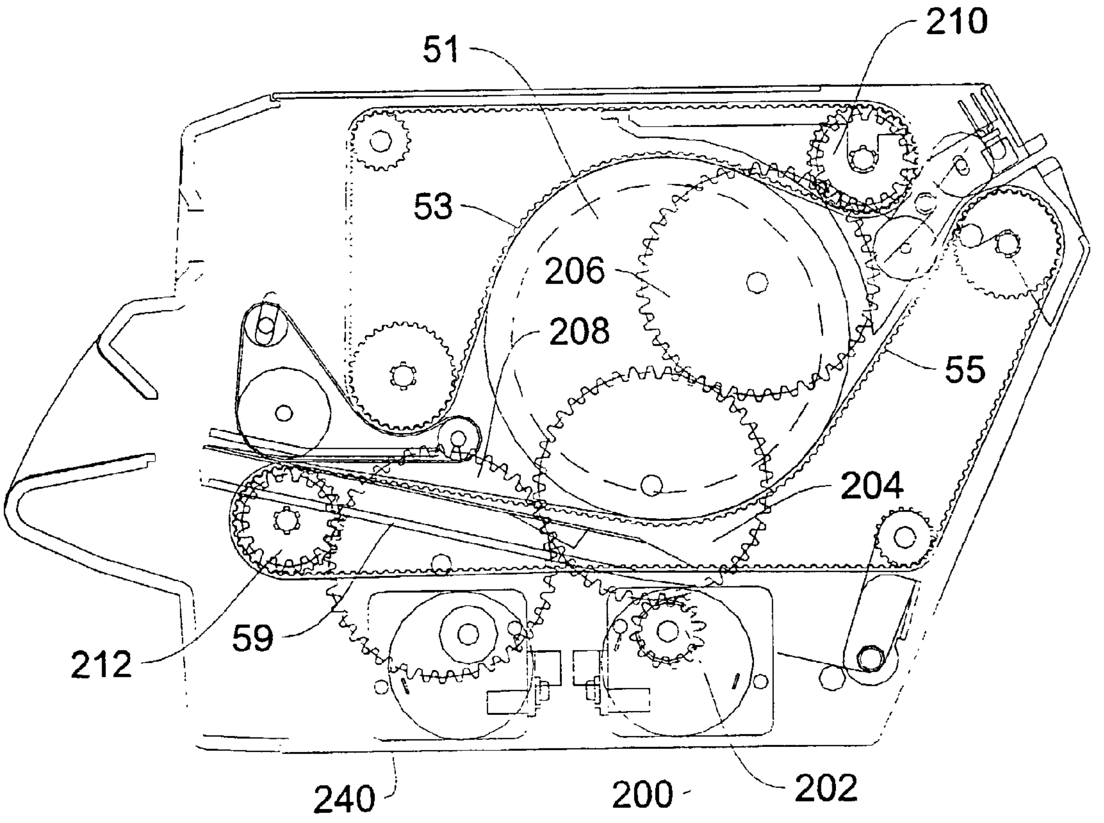
FIG. 6 is a sectional view of the stacking and dispensing module and drive arrangement of the internal belts.

The motor 200, shown in FIG. 6, drives gear 202 which drives gear 204 which in turn drives gears 206 and 208, which drive gears 210 and 212, and thereby control the device of belts 55 and 53, the drum 51 is rotated due to the drive of the belts 51 and 55.

Motor 240 in FIG. 6 controls movement of the actuator 59 and pivots the actuator about pivot point 83 to effect dispensing of the stack of banknotes.

Figure 7:
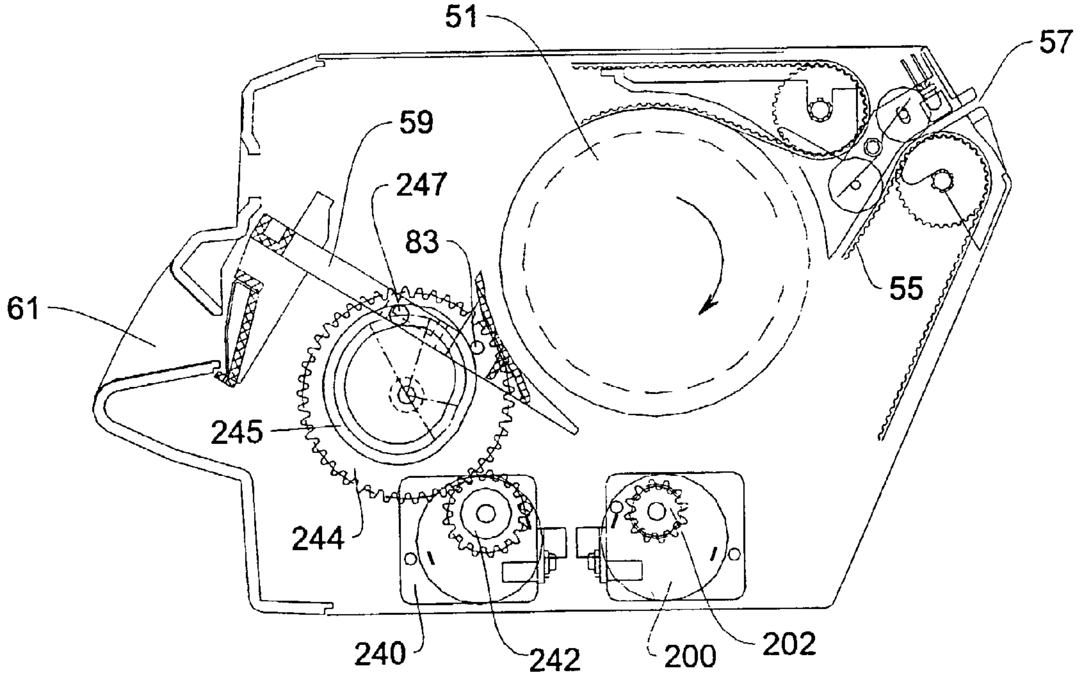
FIG. 7 is a partial sectional view showing the drive mechanism used to control dispensing of a stack of banknotes.

FIG. 7 shows motor 240 driving gear 242 which drives gear 244 and cam track 245 causing cam follower 247 to move the actuator 59 and engage the drum and simultaneously open the dispensing slot 61. Once the dispensing step has been completed, motor 240 can continue to rotate and bring the actuator back to the position of FIG. 7.

Figure 8:
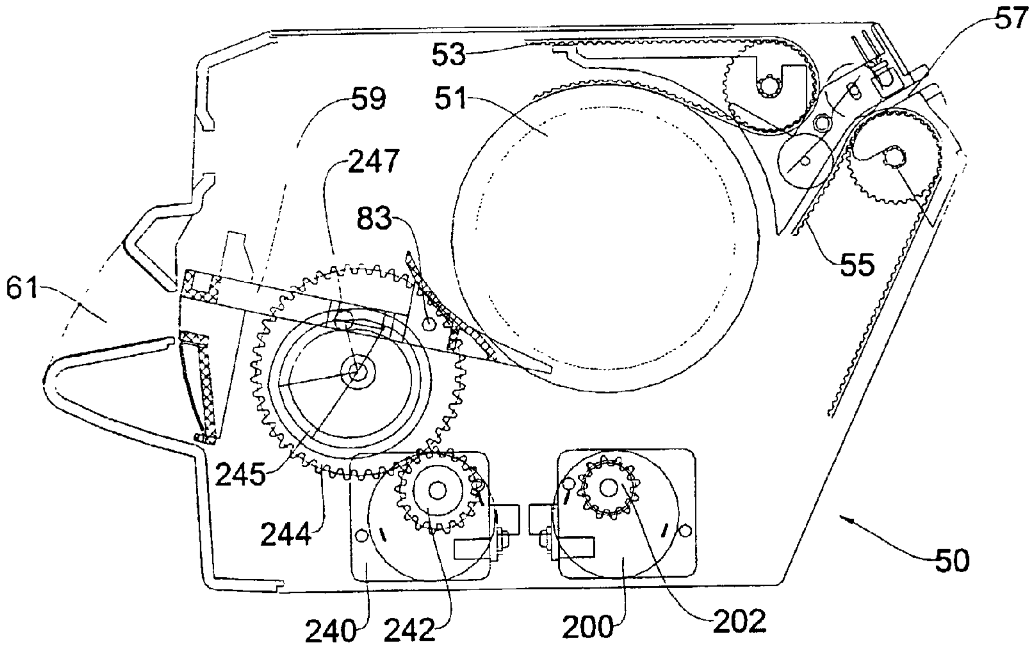
FIG. 8 is a partial sectional view showing movement of an actuator for stripping of received banknotes.
Figure 9:
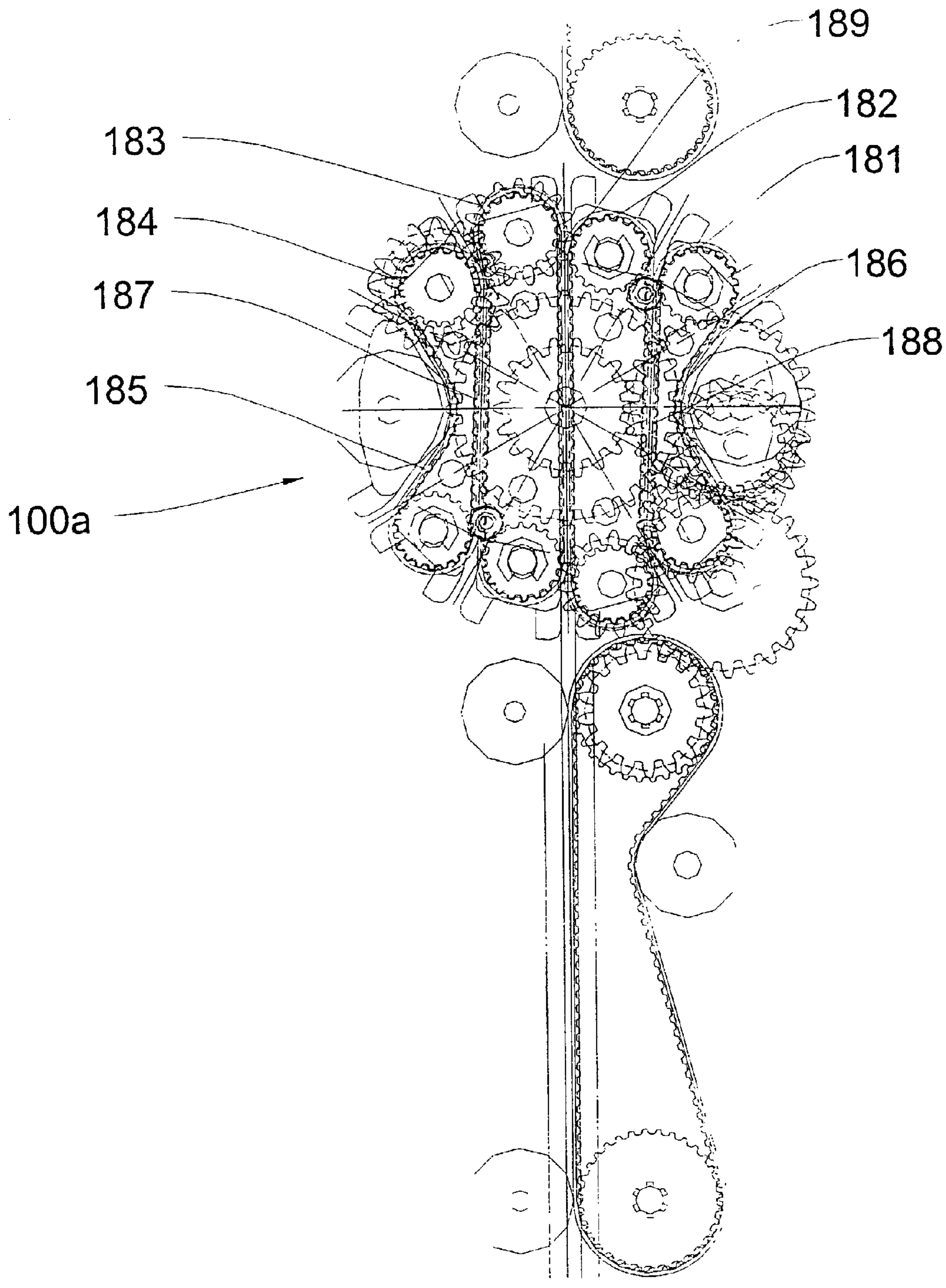
FIG. 9 is a partial view showing details of a modified rotary switch.

FIG. 8 shows the actuator 59 being brought into engagement with the drum 51 and opening of the slot 61. As can be seen, from FIG. 5 through 8, banknotes are fed through the inlet 57 and are discharged through the outlet 61. The stack of banknotes is accumulated on the drum 51 and rotates with the drum. Dispensing of the stack of banknotes is accomplished by moving of the actuator into contact with the drum 51 to strip the banknotes from the drum and cause the belt 55 to carry the banknotes as a stack to the dispensing slot 61.

FIGS. 9 through 12 show details of a modified switch 100A. In this case, four belts, 181, 182, 183 and 184, collectively define five paths, namely a first 60 degree path 185, a second 60 degree path 186, a first 120 degree path

187, a second 120 degree path 188, and the central path 189 through the switch. Basically, it can be seen that the switch has a 60 degree, a 120 degree, and a 180 degree path either side of the center line of the switch. The switch can be rotated about its central axis and can also be driven to cause the belts to move in either direction. The five paths defined through the switch, and particular, the duplication of the 60 degree and the 120 degree path, allow increased flexibility with respect to the directing of a banknote within the device. Basically, the belts on one side of the switch move in the opposite direction to the belts on the other side of the switch.

The direction of rotation is important as it must be the appropriate direction to allow driving of the banknote from one accumulator to another device. With this arrangement, merely adjustment of the switch by rotating the same 180 degrees will affect the opposite direction of banknote movement. The direction of banknote movement within each accumulator is reversible and controlled by a separate motor.

Figure 10:
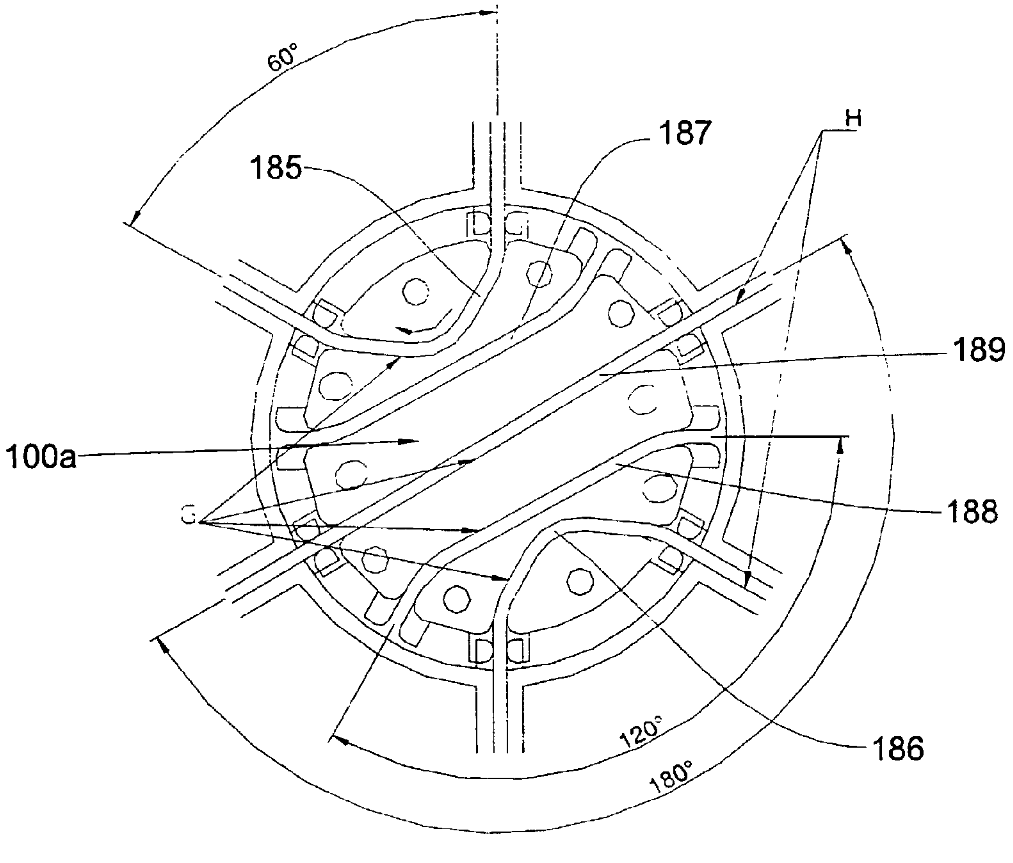
FIG. 10 is a view showing various routes through the modified rotary switch.
Figure 11:
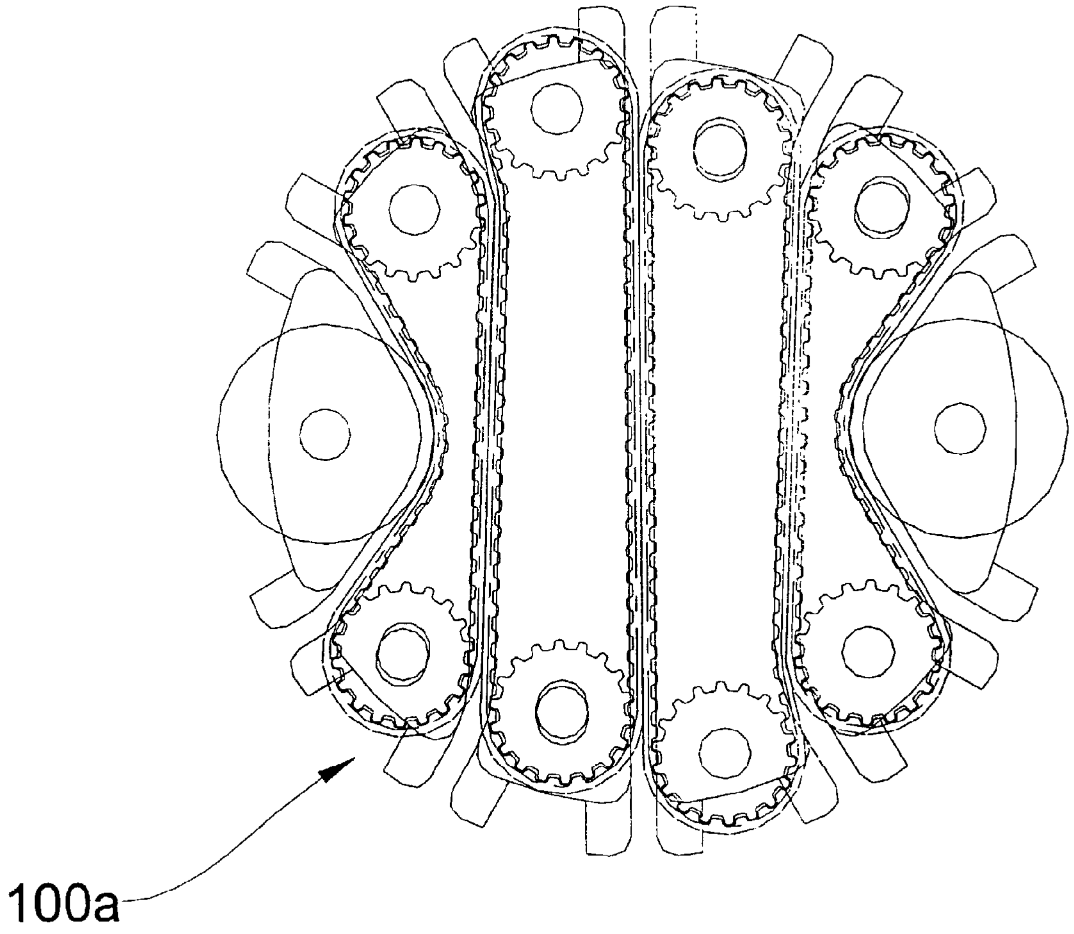
FIG. 11 is a view of the belt drives through the modified rotary switch.

The details of the five paths can be more easily appreciated from a review of FIG. 10. Details of the various belts are more clearly shown in FIG. 11. It can be seen that the five paths allow the switch to be rotated to make the necessary connection of a path between the various devices, but also the correct direction of belt travel to effect movement of the banknote between the devices.

Figure 13:
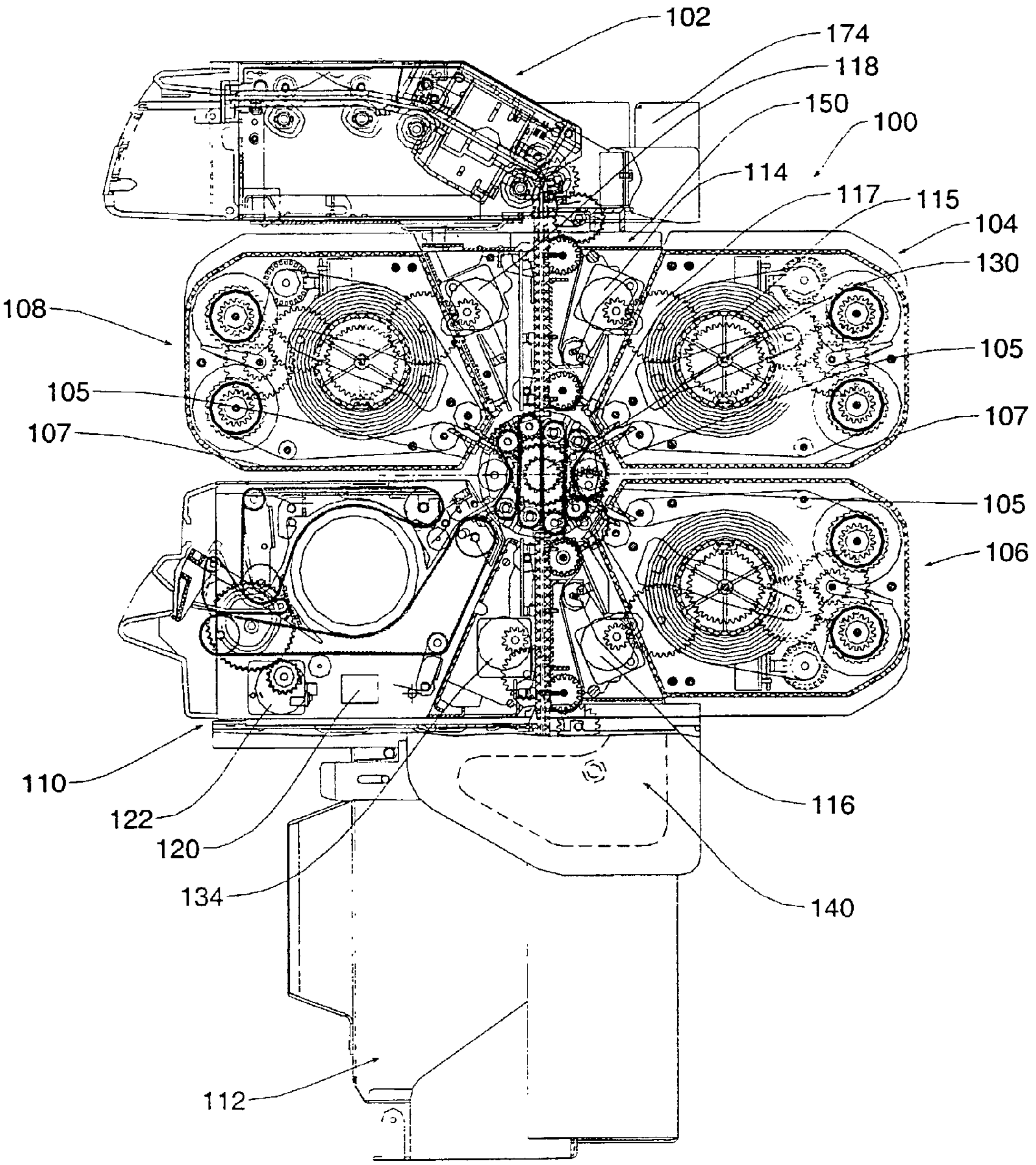
FIG. 13 is a partial sectional view through a modified accepter dispenser.

The five paths typically reduce the amount of rotation of the routing switch and reduce the need to reverse motor 134 (FIG. 13).

Figure 12:
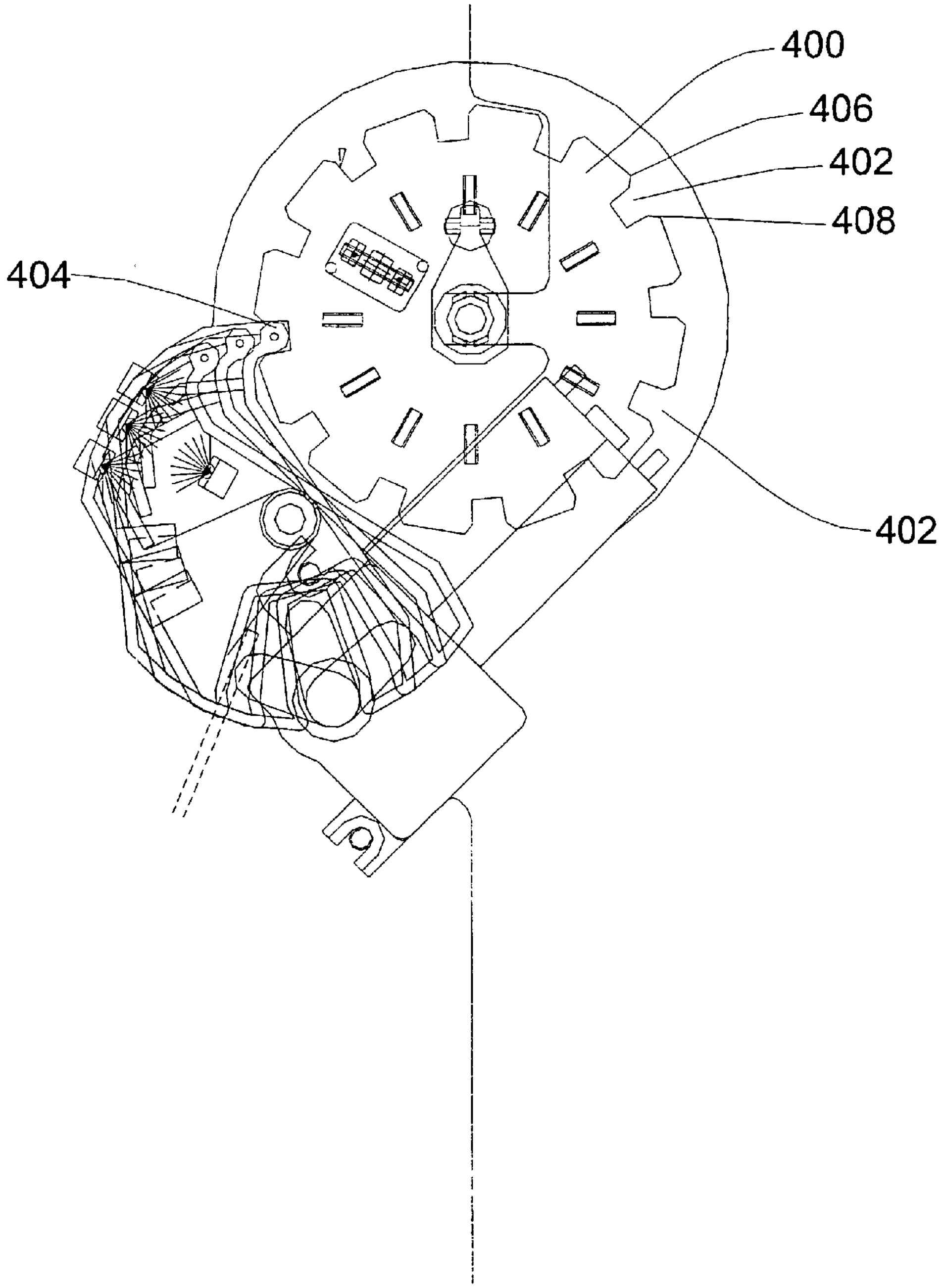
FIG. 12 is a top view showing an indexing and alignment of the rotary switch.

FIG. 12 is a top view of the rotary switch and shows one particular mechanism to provide for positive indexing of the rotary switch. It can be appreciated that it is important to not only rotate the switch the necessary number of degrees to effect the necessary connection of the paths and belts, but it is important that the alignment of the switch is fairly precise. The indexing disk 400 has a series of indexing slots 402. The indexing roller 404 is moved in and out of contact with the indexing disk 400 and the rotary switch appropriately rotated. This is accomplished such that the rotary switch is appropriately located. There may be some initial misalignment but it is generally located correctly. At this point, the levered arm with the indexing roller 404 can be brought into contact with the disk and it can be seen that there are camming surfaces 406 and 408 on either side of the slot which will engage the roller and appropriately move the disk and rotary switch to precisely align the switch with the various devices located about the rotary switch. In this way precise alignment is accomplished.

Returning to FIG. 3, it can be seen that the rotary switch 100 is supported in the main frame 60 and the validator 4, the stacker and dispenser 50 and the accumulators 40, 42 and 44, as well as the banknote cassette 50, are each removable from the main frame 60. In this way, if there is difficulty with respect to any one of these components, it can easily be replaced. Each of these devices include their own built in drive belt which assist in moving the banknote from the validator through the rotary switch or from the rotary switch to other devices. These units are not driven by their particular motor but connect with the drive train associated with the drive of the rotary switch. The units do include their own drives for certain components within the unit. The drive of the rotary switch also controls the drive of the drive belts through the switch.

The modified acceptor dispenser 100 shown in FIGS. 13 through 17 is similar to the combination unit of FIG. 1, however, in this case, the individual modules do not contain their own motor but interact with a motor positioned either side of the processing path. The stacker dispenser 110 still includes two motors 120 and 122 with motor 120 driving the drive belts within the stacker dispenser and motor 122 controlling the actuator for allowing dispensing a stack of banknotes.

As can be seen, the modified acceptor dispenser includes the central drive path 150 which passes through the routing switch 130 having five different paths for selectively connecting the discharged path from the validator with any of the accumulators 104, 106 or 108, and connecting any of these accumulators with the stacker dispenser 110. Preferrably, the stacker dispenser is also directly connectable through the routing switch with the discharge path from the validator.

Drive belts are provided both top and bottom of the routing switch 130 for moving of banknotes from the validator to the routing switch or from the routing switch to the removable banknote cassette 112. Each of the accumulators 104, 106 and 108 have been notched along one edge to make additional room for the motors 114, 116 and 118, and the drive arrangement for moving the banknote through the device.

Motor 114 through a drive train shown, drives the drum 115 on which banknotes are accumulated in a series. As earlier described, the banknotes are separated one from the other by belts and as such, are individually received and individually removable from the accumulator. A drive gear 117 projects out the edge of the module 104 and provides power to the module.

As in the earlier design, each of the modules with respect to the accumulators are of the same construction. This is advantageous in that any of the accumulators 104, 106 and 108 can be located in any of the positions shown.

In the modified design, it can be appreciated that the central drive path 150 has been enlarged and the individual modules have been notched to provide additional room for the various drive motors and drive belts associated with the routing of the banknotes. Each of the accumulators is still controlled by its own motor, but this motor is now associated with this central drive path and is connected to the module through a gear train.

Each of the accumulators 104, 106 and 108 include the angled wall 105 for mating with the routing switch 130. This angled wall is relatively short to allow more space for the drives associated with the central pathway. The angled wall preferrably forms an angle of about 120 degrees with wall 107. Wall 109 is angled rearwardly to provide additional space. With the present design four modules are spaced about the routing switch 130 such that each module has an inlet located in the same manner as the other modules. The accumulators are rotated 180 degrees about a horizontal axis and/or 180 degrees about a vertical axis to orientate the accumulator for connection with the routing switch 130.

The stacker dispenser 110 is also notched to provide additional room for locating the motor 134 with the central drive path 150. This motor through a gear train, drives the various belts associated with the central drive path. In contrast to the accumulators, the banknote stacker and dispenser 110 does include its own motors 120 and 122 within the device.

Figure 14:
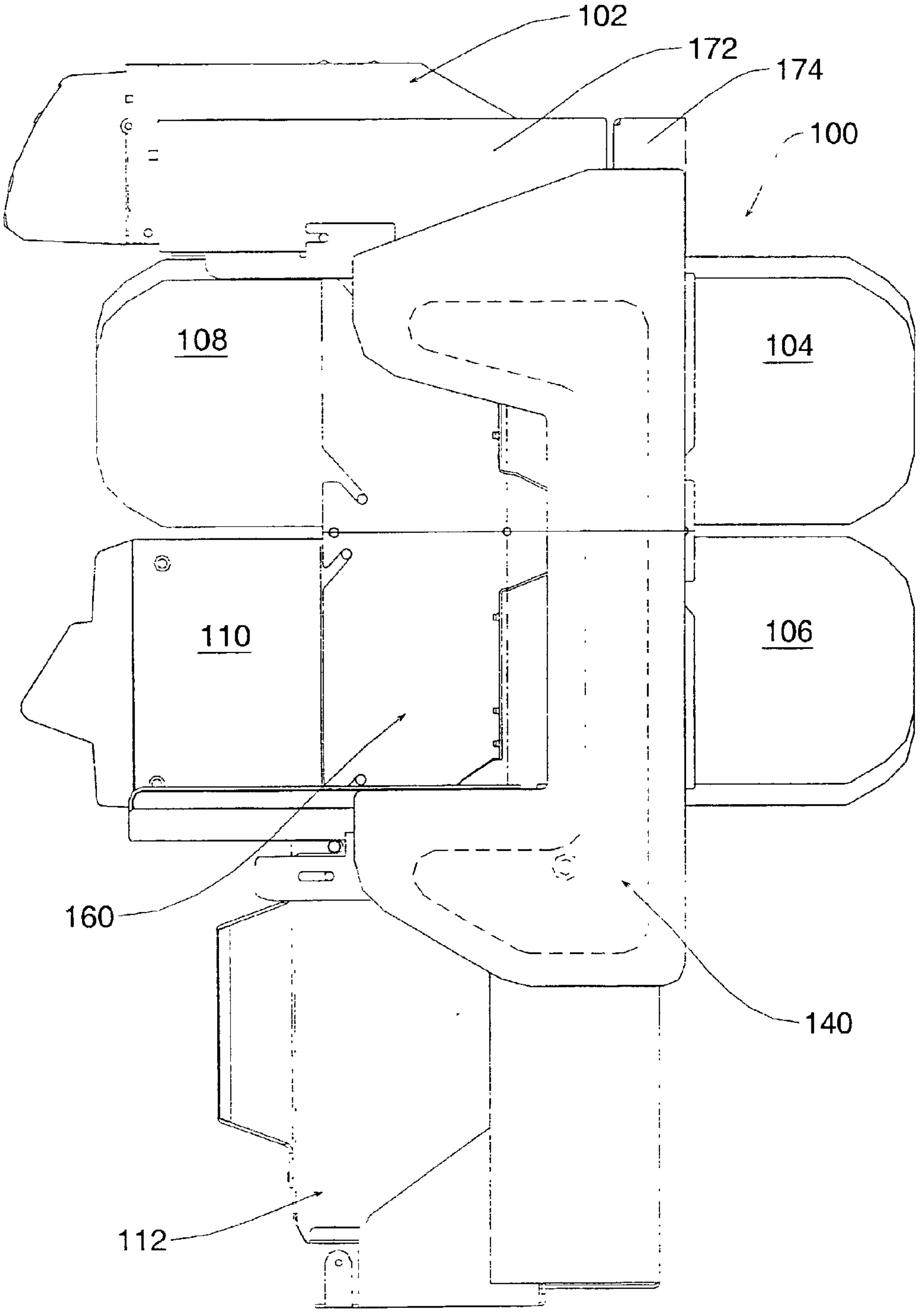
FIG. 14 is a side view of the modified acceptor dispenser in an assembled condition.
Figure 15:
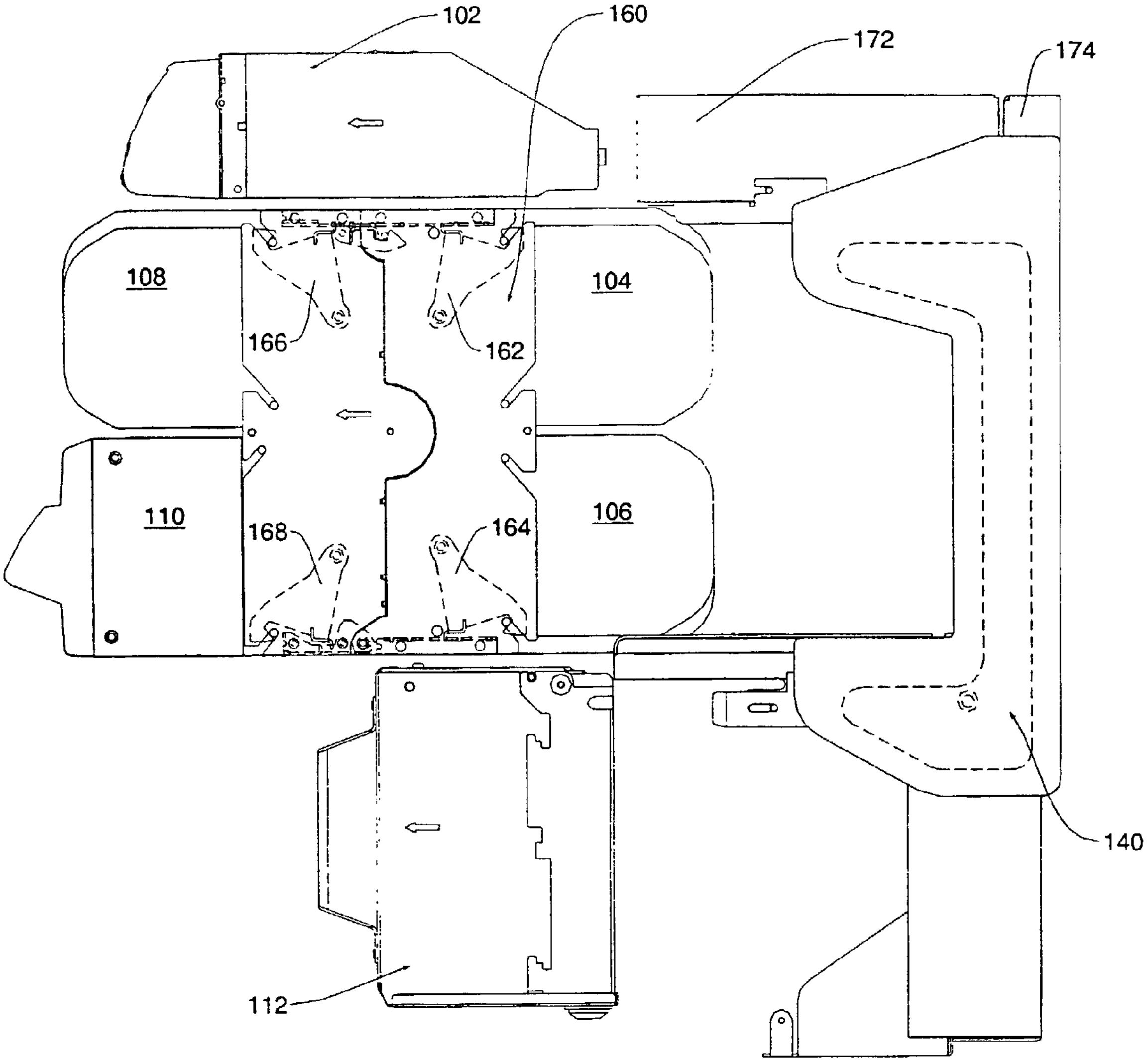
FIG. 15 is a side view showing the various components separated from a receiving frame of the modified acceptor dispenser.
Figure 16:
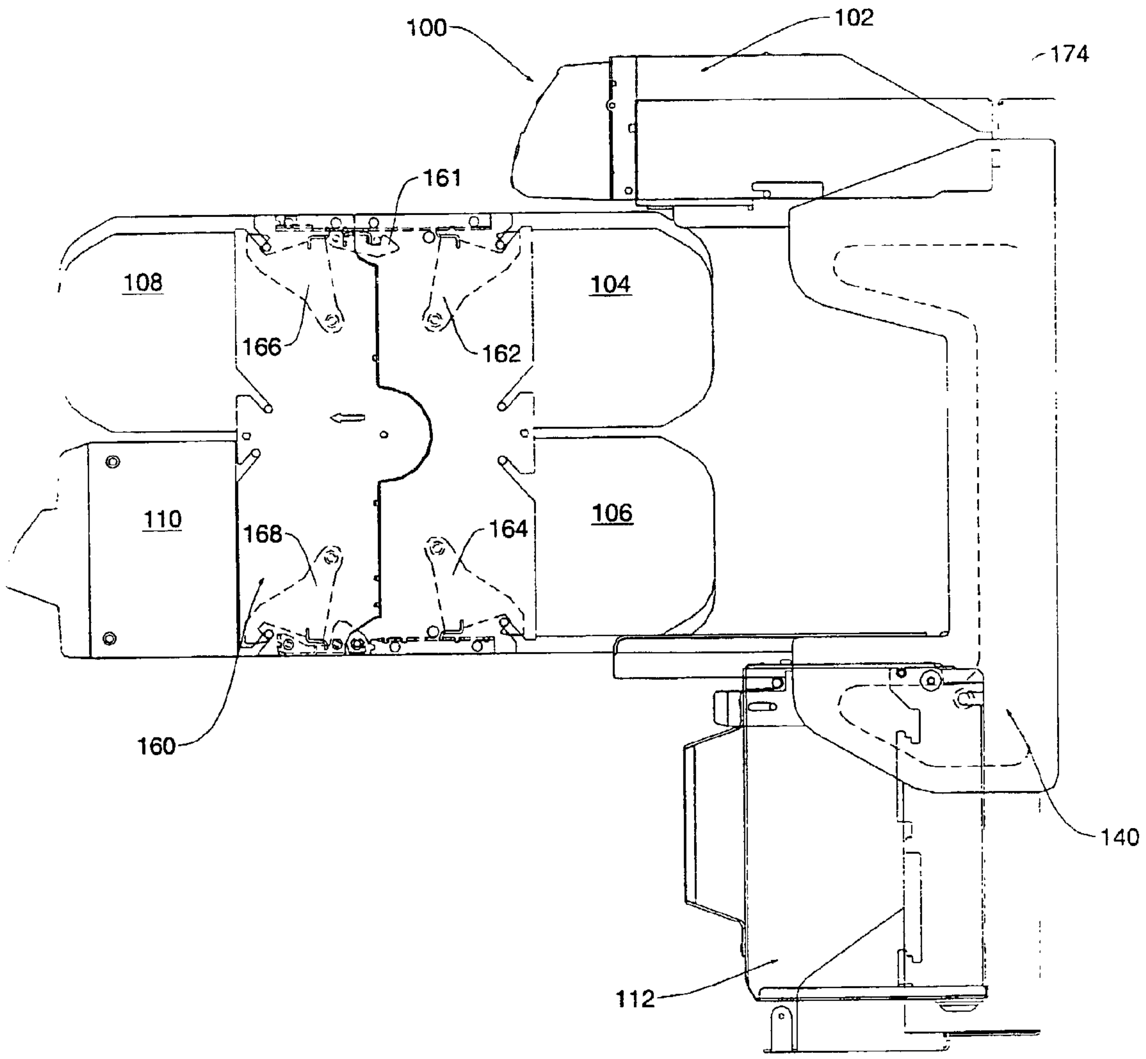
FIG. 16 is a side view showing the slide removal of certain modules and the slide chassis.

FIG. 14 and FIG. 15 show how the various modules, the banknote cassette and the validator 102 can all be removed from the frame 140. Each of these components are slidably received within the frame 140 and are slidably removable as indicated. FIG. 15 also shows the removable power backup supply 172. The combination unit also includes its own controller 174 which cooperates with the validator 102 and the various accumulators and dispensers to appropriately route and store banknotes. In addition, this controller interacts with another device such as a vending machine to provide coordinated processing.

Figure 17:
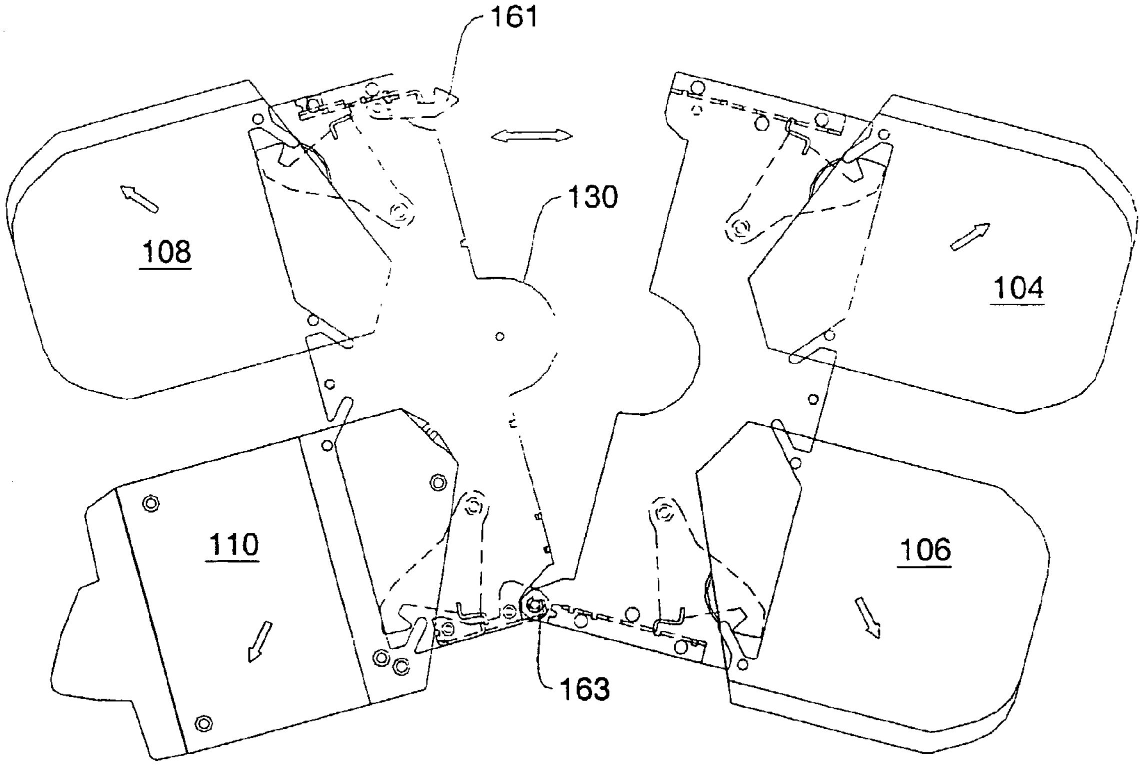
FIG. 17 is a side view of the chassis being split to service the processing pathway through the device.

FIG. 15 also shows the removable chassis 160 which releasably supports the banknote accumulators and the banknote dispenser. The central drive path 150 and the various motors are also secured and part of the chassis 160. Spring latches 162, 164, 166 and 168 serve to maintain the three accumulators and the stacker dispenser in the chassis 160. Each of these components can be removed as illustrated in FIG. 17. Replacement of any of the modules in chassis 160 provides proper registration of the modules and any drive relationship with the routing switch 130 and the drive through the central drive path 150.

The chassis 160 is also serviceable by releasing latch 161 and pivotting the two components of the chassis about the pivot axis 163. In this way the centre axis of the central drive path 150 is exposed as well as the routing switch 130. If there are problems associated with the chassis 160, it can be replaced with a further chassis. Any of the modules can be removed from the problem chassis and inserted in the new chassis. Similarly, if there are problems associated with any of the modules, they may easily be replaced. It can also be appreciated that if there are problems associated with the frame 140, it could also be replaced and the remaining components inserted in the new frame.

FIG. 3 and FIG. 13 clearly show the compact design and the clustering of the stacker and dispenser and the accumulators about the rotary routing switch and the movement of a banknote through the rotary routing switch to the banknote cassette. The device is simple and compact in design, and easily serviceable. It can further be appreciated that this design is also expandable. For example, the banknote cassette 52 of FIG. 3 can be moved downwardly and four additional modules with a rotary switch can be located at the discharge 43 at the base of the accumulator 40 and accumulator 44. In this way, eight modules can be clustered around two rotary switches and the banknote cassette located below. In such an expanded design, some of the modules could be banknote cassettes or modules where the banknote is not returnable.

FIGS. 14 through 17 clearly show the ease of service and the simple replacement of modules.

Although various preferred embodiments of the present invention have been described herein in detail, it will be appreciated by those skilled in the art, that variations may be made thereto without departing from the spirit of the invention or the scope of the appended claims.

The invention claimed is:

1. An integrated banknote acceptor and dispenser comprising a validator, a banknote dispenser, at least one banknote accumulator, and a banknote cassette, said validator receiving a banknote through a banknote inlet and evaluating the banknote as the banknote is processed through the validator to a discharge path and discharging accepted banknotes to said discharge path, said discharge path including drive means for moving the accepted banknotes from said validator through a directing switch to one of said banknote cassette, said at least one banknote accumulator, and said banknote dispenser; said directing switch being a rotary switch connectable with a stationary inlet associated with each of said at least one banknote accumulator and a stationary inlet of said banknote cassette; said directing switch having at least three routing paths through the directing switch allowing selective connection of said discharge path with any of said stationary inlets of said at least one banknote accumulator and said banknote cassette by altering the rotational position of said rotary switch and allowing connection of the stationary inlet of said at least one banknote accumulator with a stationary inlet of said banknote dispenser by altering the rotational position of said rotary switch; and wherein said banknote dispenser and said at least one banknote accumulator each include a separate drive means for receiving and discharging a banknote therefrom.

2. An integrated banknote acceptor and dispenser as claimed in claim 1 wherein said at least one banknote accumulator is at least two banknote accumulators.

3. An integrated banknote acceptor and dispenser as claimed in claim 2 wherein said banknote dispenser and said at least one banknote accumulator are separate modules which are independently removable.

4. An integrated banknote acceptor and dispenser as claimed in claim 3 wherein said banknote dispenser and said at least one banknote accumulator include a drive member exposed along one edge thereof and forming part of said drive means.

5. An integrated banknote acceptor and dispenser as claimed in claim 4 wherein said directing switch is a rotary switch having a belt drive associated with each routing path.

6. An integrated banknote acceptor and dispenser as claimed in claim 5 wherein said drive means has a motor which drives a gear train associated with said rotary switch providing power and synchronization of said drive means and the belt drives of said rotary switch.

7. An integrated banknote acceptor and dispenser as claimed in claim 1 wherein said at least one banknote accumulator is three banknote accumulators and each of said three banknote accumulators receives and accumulates banknotes of a particular denomination.

8. An integrated banknote acceptor and dispenser as claimed in claim 7 wherein the predetermined denomination of each of said three banknote accumulators is different.

9. An integrated banknote acceptor and dispenser as claimed in claim 1 wherein said directing switch selectively connects said discharge path with any of said stationary inlets.

10. An integrated banknote acceptor and dispenser as claimed in claim 7 wherein at least one of said three banknote accumulators can temporarily act as an escrow accumulator and return the banknotes if required by connection with said banknote dispenser through said directing switch.

11. An integrated banknote acceptor and dispenser as claimed in claim 10 wherein said stationary inlets of said banknote dispenser and said three banknote accumulators are located in a recess which collectively define a cavity accommodating said directing switch.

12. An integrated banknote acceptor and dispenser as claimed in claim 1 including a removable back up power supply.

13. An integrated banknote acceptor and dispenser as claimed in claim 1 used in combination with a gaming machine and providing currency exchange between said gaming machine and a user of the gaming machine.

14. A combination bill validator, bill accumulator and bill dispensing unit, said combination unit comprising a validator for receiving and evaluating banknotes and forwarding accepted banknotes to a processing pathway, and a series of modular components spaced either side of said processing pathway; said series of modular components including at least one banknote accumulator for receiving and temporarily storing accepted banknotes and outputting accepted banknotes to said processing pathway, and a banknote dispenser which receives accepted banknotes from said processing pathway and discharges accepted banknotes through a discharge port; said combination unit further including a removable banknote cassette connected to said processing pathway for receiving and storing accepted banknotes in a stacked manner, and wherein said processing pathway includes a drive arrangement located in said processing pathway for engaging and driving accepted banknotes along said processing pathway to any of said modular components; said processing pathway including a central switch located intermediate said modular components for selectively connecting said processing pathway with any of said modular components and said banknote cassette.

15. A combination unit as claimed in claim 14 wherein said modular components are located in opposed pairs of modular components with said processing pathway therebetween.

16. A combination unit as claimed in claim 15 wherein said modular components each includes a banknote drive for driving a banknote within each modular component.

17. A combination unit as claimed in claim 16 wherein said banknote dispenser is located opposite said banknote accumulator with said processing pathway therebetween, and said series of modular components include two additional banknote accumulators below said dispenser in opposed relationship with an extension of said processing pathway therebetween.

18. A combination unit as claimed in claim 17 wherein said banknote cassette is separated from said validator by said banknote accumulators and said banknote dispenser.

19. A combination unit as claimed in claim 18 wherein said combination unit includes a separate controller and processing arrangement and wherein said modular components are all controlled by said separate controller and processing arrangement.

20. A combination unit as claimed in claim 17 wherein said combination unit cooperates with a gaming machine in respect of financial transactions associated with the gaming machine.

21. A combination unit as claimed in claim 20 wherein said combination unit is part of a gaming machine.

22. An integrated banknote acceptor and dispenser as claimed in claim 14 used in a gaming machine for currency transactions.

23. A combination bill validator, bill accumulator and bill dispensing unit, said combination unit comprising a validator for receiving banknotes and evaluating banknotes and forwarding accepted banknotes to a processing pathway, and a series of stacked modular components located either side of said processing pathway; said series of modular components including three banknote accumulators for receiving and temporarily storing accepted banknotes and outputting accepted banknotes to said processing pathway, a removable banknote cassette for receiving and storing accepted banknotes in a stacked manner, and a banknote dispenser which receives accepted banknotes from any of said three banknote accumulators and discharges received accepted banknotes through a discharge port; and wherein said processing pathway includes a central routing switch for connecting said processing pathway with any of said three banknote accumulators and said banknote dispenser; said banknote accumulators and said banknote dispenser being located to surround said central routing switch and said modular components include a notched out region for accommodating said central routing switch.

24. A combination unit as claimed in claim 23 wherein said central routing switch has at least three paths therethrough for selective routing of accepted banknotes from said processing pathway to said modular components and from any of said three banknote accumulators to said banknote dispenser.

25. A combination unit as claimed in claim 24 wherein said banknote dispenser and said banknote accumulators each include an additional banknote drive for driving a banknote received within the modular component.

26. A combination unit as claimed in claim 25 wherein said banknote cassette is separated from said validator by said banknote accumulators and said banknote dispenser.

27. A combination unit as claimed in claim 26 wherein said combination unit includes a separate controller and processing arrangement and wherein said modular components are all controlled by said separate controller and processing arrangement.

28. A combination unit as claimed in claim 23 wherein each accumulator is configured to be received on either side of said processing pathway.

29. A combination unit as claimed in claim 23 in combination with a gaming machine and cooperating therewith to complete financial transactions associated with the gaming machine.

* * * * *